(12) United States Patent
Boydens et al.

(10) Patent No.: US 10,925,205 B2
(45) Date of Patent: Feb. 23, 2021

(54) TRACTOR-TRAILER COMBINATIONS

(71) Applicant: CNH Industrial America LLC, New Holland, PA (US)

(72) Inventors: Joachim Boydens, Zedelgem (BE); Thomas Debbaut, Ronsele (BE); Didier Verhaeghe, Ypres (BE)

(73) Assignee: CNH Industrial America LLC, New Holland, PA (US)

( * ) Notice: Subject to any disclaimer, the term of this patent is extended or adjusted under 35 U.S.C. 154(b) by 274 days.

(21) Appl. No.: 15/975,304

(22) Filed: May 9, 2018

(65) Prior Publication Data

US 2018/0325013 A1 Nov. 15, 2018

(30) Foreign Application Priority Data

May 9, 2017 (BE) .................................. 2017/5333

(51) Int. Cl.
*A01F 15/08* (2006.01)
*A01B 69/00* (2006.01)
(Continued)

(52) U.S. Cl.
CPC ............ *A01B 69/008* (2013.01); *A01B 69/00* (2013.01); *A01B 69/001* (2013.01);
(Continued)

(58) Field of Classification Search
CPC ..... A01B 69/001; A01B 69/008; A01B 69/00; A01D 89/001; A01F 15/08;
(Continued)

(56) References Cited

U.S. PATENT DOCUMENTS

| 4,433,533 A | 2/1984 | Giani |
| 7,404,355 B2 * | 7/2008 | Viaud ................. A01F 15/0833 100/4 |

(Continued)

FOREIGN PATENT DOCUMENTS

| EP | 0346586 A2 | 12/1989 |
| EP | 2272312 A1 | 1/2011 |
| FR | 2684517 A1 | 6/1993 |

OTHER PUBLICATIONS

BC5000 brochure, published by New Holland Brand Communications, printed May 2017, 8 pages.

*Primary Examiner* — Robert E Pezzuto
(74) *Attorney, Agent, or Firm* — Peter Zacharias; Patrick Sheldrake

(57) ABSTRACT

A movable tractor-trailer combination includes a self-powered tractor having a plurality of ground-engaging members and a steering mechanism for steering at least one the ground-engaging member; and a trailer that is towed behind the tractor and that is connected to the tractor by a drawbar that is pivotably connected at a tractor connection to the tractor. One or more sensors sense a line of a swath of crop material corresponding to a maximal quantity of crop material per unit length of the swath. The tractor-trailer combination includes a control apparatus that operates in dependence on at least one output of the one or more sensors to operate the steering mechanism of the tractor in dependence on the at least one output such that the tractor moves along the swath without any of the ground-engaging members running over the swath.

15 Claims, 6 Drawing Sheets

(51) Int. Cl.
*A01B 69/04* (2006.01)
*G05D 1/02* (2020.01)
*A01D 89/00* (2006.01)

(52) U.S. Cl.
CPC ............ *A01D 89/001* (2013.01); *A01F 15/08* (2013.01); *G05D 1/0212* (2013.01); *G05D 1/0223* (2013.01); *G05D 1/0231* (2013.01); *G05D 2201/0201* (2013.01)

(58) Field of Classification Search
CPC ............ A01F 15/0833; A01F 15/0883; G05D 1/0212; G05D 1/0223; G05D 1/0231
USPC .... 56/10.2 R, 10.2 A–10.2 G, 341; 100/2, 4, 100/5, 43, 48, 99, 88, 100; 172/2–11
See application file for complete search history.

(56) References Cited

U.S. PATENT DOCUMENTS

| | | | |
|---|---|---|---|
| 8,200,399 B2* | 6/2012 | Madsen | A01F 15/08 56/10.2 A |
| 9,706,697 B2* | 7/2017 | Wilkening | A01F 15/08 |
| 2005/0102079 A1 | 5/2005 | Hofer et al. | |
| 2010/0122632 A1* | 5/2010 | Biziorek | A01F 15/0715 100/2 |
| 2012/0029732 A1 | 2/2012 | Meyer | |

* cited by examiner

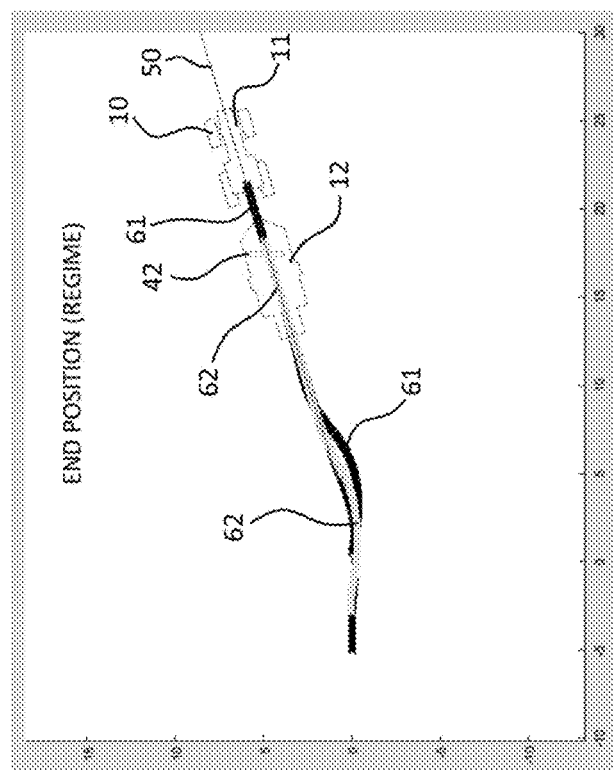
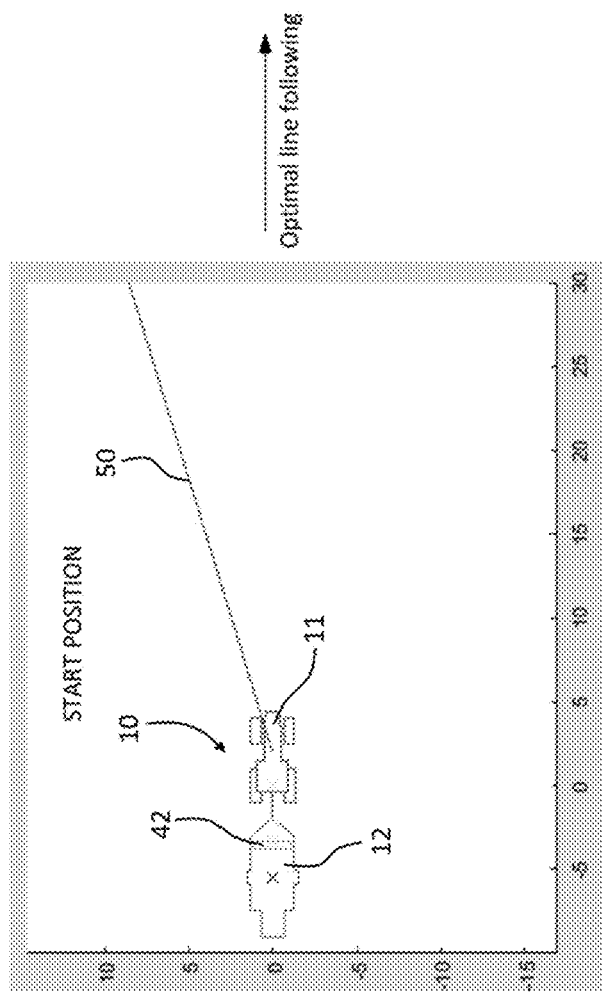
Figure 3b
Figure 3a

TRACTOR-TRAILER COMBINATIONS

FIELD OF THE INVENTION

The invention concerns improvements in or relating to tractor-trailer combinations.

BACKGROUND OF THE INVENTION

It is well known in the technical field of agricultural machines to tow a wheeled trailer behind a tractor such that the trailer can perform specific tasks. An example of such a trailer, to which the invention particularly pertains, is a baler or baling machine that creates bales of valuable stalk (or other plant constituent) products such as hay, silage vegetation and straw that are deposited in fields as harvesting or mowing operations take place. In the majority of cases the baler is neither autonomous nor self-powered, and instead is towed behind an agricultural tractor from which it derives rotary power to drive its pickup components and internal machinery.

The hay, straw or similar products requiring baling usually are left in fields in the form of swaths or windrows, i.e. elongate rows of the products in question that are heaped in the transverse centre and tend to flatten at the respective transverse edges. Although according to some definitions there are differences between e.g. swaths and windrows, except where the context requires these terms are used interchangeably herein.

Each swath usually extends in as straight a line as possible for almost the entire length of a field or along lines that are equidistant from the field periphery or from contours in the field. Typically a field that has undergone harvesting contains many, essentially mutually parallel, swaths. The swaths are spaced from one another by largely consistent gaps that normally are determined by the widest part, that usually is the header or front cutter bar, of the harvesting or mowing machine employed to cut the harvest products in question.

The width of a swath is nearly always less than the track of the wheels of a tractor that must subsequently pass along the swaths. As a result such a tractor may travel with one set of wheels on either side of the swath during baling work. However as explained herein sometimes this is not possible or desirable, for at least part of the travel of the tractor along the swath.

In some cases, especially when the harvest product is hay, it is known to use a haybob, tedder or rake attached to a tractor after the swaths have lain for a certain period, in order to turn over the swaths left by the mowing machine and thereby achieve a desired degree of aeration of the stalks (or other plant parts of these are of interest). In such cases the resulting windrows while generally following the lines of swaths left by the mowing machine may be of differing dimensions from those of the as-deposited stalks, etc.

The invention is applicable in the use of balers to bale stalks or other plant parts as deposited in swaths or in windrows created by a primary operation such as harvesting or mowing; or a secondary operation such as raking, tedding or hay bobbing.

Balers fall in to several categories. The most common types presently in use are those for creating so-called "round" bales, usually of hay or straw (that are approximately cylindrical); and those for creating so-called "rectangular" or "square" bales (that are cuboidal). Each bale type is associated with particular storage and handling characteristics.

Among rectangular balers the most common types produce either "large rectangular bales" or "midi rectangular bales". As the names imply, the former are larger than the latter.

Regardless of the exact type, in use a baler is hitched to the rear of a tractor and the power take-off (PTO) shaft of the tractor connected to provide rotary drive to the baler. The PTO shaft rotates at a speed determined by the settings of the tractor engine and in some cases certain other variable parameters that are settable e.g. by the tractor driver or as a result of automatic or semi-automatic control actions initiated in the tractor or baler such as when one or more sensors produces a particular output, class of output, value or range. Typically the PTO shaft includes a universal joint or similar flexible drive-transferring arrangement, with the result that the connection to the baler does not have to be directly in line with the PTO connection on the tractor, and instead may be offset laterally from it.

The PTO shaft provides rotary drive for the various parts of the baler that move to cause ingestion and baling of stalks. U.S. Pat. No. 4,433,533-A includes an explanation of the operation of a round baler. An example of rectangular baler operation is described in FR-2684517-A.

The invention is applicable to round balers and rectangular balers of all types, and indeed may be used whenever it is required to tow a baling machine or another towed vehicle in the vicinity of swaths or windrows.

U.S. Pat. No. 4,433,533-A and FR-2684517-A both describe arrangements in which the transverse centre of a towed baler may be moved towards and away from an offset position relative to the centre line of the tractor during towing to pick up stalks. This is desirable in order to control the position, relative to the centre line (peak height) of the swath, of the part of the front opening of the baler into which stalks (or other plant parts) are ingested, and thereby assure even filling of the chamber(s) of the baler. This is beneficial because uneven filling can lead to the creation of bales that are of an incorrect shape, and/or are insufficiently strong for handling and storage, and/or are of varying density and hence low commercial value.

As mentioned, in general agricultural workers seek to produce swaths that are as straight as possible. This makes it easier for tractor drivers to drive their vehicles along them and it also facilitates the use of features such as those described in U.S. Pat. No. 4,433,533-A and FR-2684517-A.

In a field characterised by straight swaths, a tractor usually may readily manoeuvre in the headland (in which there are no swaths) and (if the headland is broad enough) line up so that the tractor-baler combination extends parallel to a swath, before baling operations commence. The combination then may move along the swath either with the wheels of the tractor and baler straddling the swath and the baler towed directly behind the tractor; or with only the wheels of the baler straddling the swath and the tractor running alongside the swath by reason of an offsetting arrangement such as those mentioned in the prior art.

However many fields are not rectangular; and many include obstacles such as trees, ponds and ditches that cannot be negotiated by either a harvesting machine or a tractor towing a baler or other trailer.

In such cases it can be impossible to produce swaths that extend in straight lines from one side of the field to the other. In such situations bends, interruptions and even corners in swaths may result.

Gradients in fields also sometimes necessitate the introduction of non-straight swaths, or at least sections of swaths that are not straight. Thus swaths including curves, corners and other non-straight features are commonplace.

When towing a baler it usually is an objective of the tractor driver to maintain a particular part (such as the transverse centre point) of the baler in line with the centre line of the swath to be baled. When the swath curves or otherwise adopts a non-straight form this means that adjustments of the direction of travel of the tractor are required. Even if the swaths are not curved, such adjustment is frequently required when the tractor-baler combination is at the end of the swath, because there is insufficient room in the headland to permit the combination to turn and then straighten before baling is required to commence. This aspect is explained in more detail below.

Such adjustments may cause the front or rear wheels (or ground engaging tracks, if these are present instead of wheels) of the tractor to cross and therefore run over the swath/windrow.

Running over the swath is problematic, for various reasons.

Firstly the act of running over the swath compresses the un-baled stalks so that the density of the crop material increases. A baler towed behind a tractor that has run over the swath therefore is likely to ingest crop material of varying density as it moves along. This can cause inconsistencies in the formation, quality and dimensions of the bales.

Secondly the act of running over the swath changes its cross-section. It is known in certain types of agricultural vehicle, including many tractors, to include image-generating sensors that assess e.g. the peak height of the swaths, and the shape of the swath cross-section. An example is available at https://www.youtube.com/watch?v=9JIr_7H5pvQ Clearly a section of swath or windrow that has been run over almost certainly will adopt a different cross section, with a lower peak height, than the remainder of the swath/windrow. The existence of such sections may cause the sensor(s) to trigger control actions such as slowing down the tractor or adjusting the height of the baler pickup in order to compensate for the swath variations. Such actions are likely to reduce the efficiency of baling operations, and also may cause inconsistencies in bale quality e.g. because the control systems of the tractor or baler cannot react quickly enough to the usually short length of swath that is crushed as a result of being run over.

If the swath is constituted by green plant parts intended to form silage, running over the swath may cause the crop material to become mingled with non-plant substances, such as dirt, stones and rocks, that can then become ingested into the baler. Such substances can cause premature wear of the internal parts of the baler. Moreover mixing of the crop material with other substances can lead to undesirable contamination of the crop material.

More generally, crushing the swath can simply make it harder for the pickup of the baler to gather and ingest all the stalks, etc., constituting it, leading to waste and inefficiency.

The aforementioned problems can be particularly acute when the tractor-baler combination turns e.g. approximately at 90 degrees from a headland to commence baling of a swath. If the swath is curved near its end at which the tractor-baler combination commences baling it may be necessary for the tractor to perform repeated direction adjustments as it travels the first few metres after turning, in order to keep the centre of the pickup in line with the centre of the swath. This may result in e.g. the front wheels of the tractor running over the swath several times, with serious impacts on bale quality, baling efficiency, machine settings and so on. This phenomenon may be more pronounced when the headland is relatively narrow since in such a case there is insufficient space to align the baler properly before it encounters the end of the swath.

Although the foregoing aspects are described with reference to baling operations, similar problems of running over swaths may arise when the tractor tows a different kind of trailer. An example is a low-loader that may be needed during baling operations for transporting completed bales to e.g. a shed or wholesaler. Further examples include rakes, hay bobs and tedders. If such a trailer is required to travel over parts of the field in which un-baled swaths remain the tractor driver will attempt to follow the lines of the swaths in order to avoid damage to them. At such a time any requirement to turn the tractor in order to maintain the trajectory of the trailer along the swath may cause the wheels of the tractor to run over the swaths in a similar manner to that described above. The invention is applicable in such situations, although its primary benefit is expected to arise when a baler, as opposed to any other kind of trailer, is being towed in a field containing swaths or windrows.

SUMMARY OF THE INVENTION

According to the invention in a broad aspect there is provided a movable tractor-trailer combination including (a) a self-powered tractor having a plurality of ground-engaging members and a steering mechanism for steering at least one said ground-engaging member so as to cause changes in a direction of movement of the tractor; (b) a trailer that is towed behind the tractor as the tractor moves forwardly and is connected to the tractor by a drawbar that is pivotably connected at a tractor connection to the tractor and at a location spaced along the drawbar to an attachment location on the trailer; (c) one or more sensors for sensing a line of a swath of crop material corresponding to a maximal quantity of crop material per unit length of the swath; and (d) a control apparatus that operates in dependence on at least one output of the one or more sensors, wherein the control apparatus operates the steering mechanism of the tractor in dependence on the at least one output such that the tractor moves along the swath without any of the ground-engaging members running over the swath.

Such an arrangement is a significant improvement on the existing tractor-trailer combination designs, in which as noted there is a danger of the tractor running over the swath, and hence giving rise to inferior or even valueless bales. The tractor-trailer combination of the invention prevents such events.

As mentioned the primary application of the invention arises when a baler is towed in a field of un-baled harvest products. To this end preferably the trailer is a baler that includes (e) a pickup extending transversely relative to the baler for causing ingestion of crop material lying on the ground into the baler for baling; (f) one or more chambers for receiving crop material ingested by the pickup and forming the crop material into bales; (g) at least one actuator that is operable to steer the baler relative to the tractor; and (h) a control apparatus that operates in dependence on at least one output of the one or more sensors to cause the at least one actuator to steer the baler relative to the tractor in order to optimise the ingestion of crop material via the pickup.

Preferably the tractor includes a speed control mechanism for controlling the speed of forward movement of the tractor-baler combination; and the control apparatus additionally is operatively connected to the speed control mechanism in order to control the forward speed of the tractor-trailer combination in dependence on the at least one output.

This feature is especially beneficial when the tractor makes a tight turn in order to align the tractor-baler combination with the end of a swath or windrow. At such a time it may be desirable to slow the tractor in order to limit its forward movement per unit of turn circumference as part of a control philosophy aimed at preventing running over of the harvest matter in the swaths/windrows.

The speed control mechanism also beneficially may operate on the basis of other inputs than that indicated. Thus for example information on the tightness of the turn being executed may be used as a further input. Such information may be derived from software that seeks to control the steering of the tractor as aforesaid, or e.g. by measuring the steering angle of the steerable wheels (or other ground-engaging members) of the tractor.

Also preferably the at least one actuator when present as part of the baler described above extends between a forward location on the drawbar and a location on the baler disposed rearwardly of and offset transversely from the forward location such that operation of the actuator causes steering of the baler relative to the tractor about the attachment location.

The preferred form of actuator is a hydraulic ram as described herein. However other forms of actuator, that are not limited to linearly extensible types and may be e.g. rotary devices, are within the scope of the invention.

Optionally the trailer includes a main frame, at least one steerable axle defining a pivot and at least one steering arm that is connected to the steerable axle, at least one further actuator being pivotably secured at each of two ends to extend between the steering arm and an anchor location that is fixed relative to the main frame such that operation of the at least one further actuator causes force to act on the steering arm whereby to cause steering of the steerable axle about the pivot.

In more detail preferably the trailer includes a pair of steerable axles on opposite sides of the trailer that are linked by a steering link member secured pivotally at each of two ends to a respective said steerable axle such that the axles steer simultaneously.

Thus the invention extends to arrangements in which the trailer, especially a baler, includes at least one steerable axle, as is known per se in the art. It is however believed to be a significant departure from prior art arrangements to arrange for such an axle to respond to steering commands aimed at maintaining e.g. the transverse centre of the baler pickup in a preferred part of the swath or windrow (that typically is the part having the highest density of crop material).

Additionally or alternatively to the foregoing arrangements optionally the tractor includes a hitch defining a pivotable connection of the drawbar to the tractor, the hitch being moveable transversely relative to the remainder of the tractor, the tractor including a hitch actuator for causing transverse movement of the hitch relative to the remainder of the tractor, and the control apparatus being operatively connected to operate the hitch actuator in dependence on the at least one output in order to optimise the trajectory of the trailer relative to the transverse extent of the swath.

In particular when the trailer of the tractor-trailer combination is a baler the control mechanism operates the further actuator in dependence on the at least one output to optimise (i.e., typically maximise) the ingestion of crop material via the pickup of the baler.

This feature provides a further advantageous option in terms of offsetting of the baler relative to the longitudinal centre line of the tractor. Indeed if the three mechanisms described for effecting offsetting of the baler relative to the tractor are present in one and the same tractor-baler combination the flexibility to control the position of the baler relative to the line of the swath or windrow containing the highest density of stalks or other harvest products is maximal. However, benefits in terms of baler efficiency may arise even if one or two of the offsetting arrangements are present.

Conveniently at least one said sensor is supported by or forms part of the tractor. The sensor, which may take a variety of forms but in preferred embodiments of the invention is an optical device, is likely to be forward facing. A location on the cab or engine hood of the tractor provides an uninterrupted "line of sight" between the sensor and the swaths or windrows, although other sensor locations are also viable.

In preferred embodiments of the invention the optical device generates an output derived from a two-dimensional image of the cross-section, silhouette or outline of a swath captured by the optical device.

Advantageously the optical device is operatively coupled to a controller that generates a predicted line of a swath derived from a plurality of two-dimensional images of the cross-section, silhouette or outline of a swath captured sequentially by the optical device as the tractor moves forwardly.

Preferably the control apparatus is capable of controlling the steering mechanism of the tractor so as to maintain a predetermined minimum offset of a chosen location on the tractor from the line of the swath, the minimum offset corresponding to an integer or non-integer multiple of the widest transverse width of the tractor between ground-engaging members.

In a preferred embodiment of the invention the controller determines the deviation of a predetermined part of the trailer from the predicted line of the swath, generates an error signal proportional to the deviation and transmits the error signal to the at least one actuator such that the actuator causes steering of the trailer relative to the tractor in a manner that minimises the error signal.

Preferably the control mechanism includes a programmable device that is programmed and operatively coupled to effect steering of the tractor-trailer combination in dependence on at least one output of the one or more sensors by causing the at least one actuator to steer the trailer relative to the tractor in order to optimise the ingestion of crop material via the pickup, and to operate the steering mechanism of the tractor in dependence on the at least one output such that the tractor moves along the swath without any of the ground-engaging members running over the swath.

The invention is also considered to reside in a baler for forming part of a tractor-baler combination according to the invention as defined and comprising (a) a pickup extending transversely relative to the baler for causing ingestion of crop material lying on the ground into the baler for baling; (b) one or more chambers for receiving crop material ingested by the pickup and forming the crop material into bales; (c) at least one actuator that is operable to steer the baler relative to a tractor, the baler being towable behind the tractor along a swath of crop material; and (d) an attachment location that is pivotably connectable to one end of a drawbar that is pivotably connectable to a tractor, the baler including or being connectable to a control apparatus that operates in dependence on at least one output of one or more sensors to cause the at least one actuator to steer the baler relative to a towing tractor in order to optimise the ingestion of crop material via the pickup, wherein the control mechanism is capable of operating the steering mechanism of the tractor in dependence on the at least one output to cause the tractor to move along the swath without any of the ground-engaging members running over the swath.

In a further aspect of the invention there is provided a computer-readable medium containing instructions for the operation of a programmable device of a tractor-trailer combination according to any of claims 1 to 12 hereof or a baler according to claim 13 hereof to cause the at least one actuator to steer the trailer or baler (as appropriate) relative to the tractor in dependence on at least one output of the one or more sensors in order to optimise the ingestion of crop material via the pickup, and to operate the steering mechanism of the tractor in dependence on the at least one output such that the tractor moves along the swath without any of the ground-engaging members running over the swath. In a preferred embodiment of the invention the computer-readable medium is operatively connected to a controller forming part of a tractor-trailer combination according to any of claims 1 to 12 or a baler according to claim 13 hereof.

In yet a further aspect the invention resides in a tractor-trailer combination according to any of claims 1 to 12 hereof including operatively connected thereto a computer-readable medium according to claim 14 hereof.

Thus the apparatus of the invention advantageously solves an extant problem in the prior art, in a manner that preserves many desired features of known tractor-baler combinations. The invention moreover is versatile since it is not limited to specific tractor and baler types. On the contrary, a wide variety of tractors and balers or other trailers may be modified or designed to include the features of the invention.

The invention decreases the loss in yield in forage, silage and straw industries in a relatively low-cost manner and is expected to increase the reliability of baling operations.

BRIEF DESCRIPTION OF THE DRAWINGS

There now follows a description of a preferred embodiment of the invention, by way of non-limiting example, with reference being made to the accompanying drawings in which:

FIGS. 3a and 3b illustrate a sequence of movements of a tractor-trailer combination not according to the invention, or in which the control according to the invention as described herein is inoperative, as it turns from a headland to run along a swath in a field;

DETAILED DESCRIPTION OF THE DRAWINGS

Figure 1:
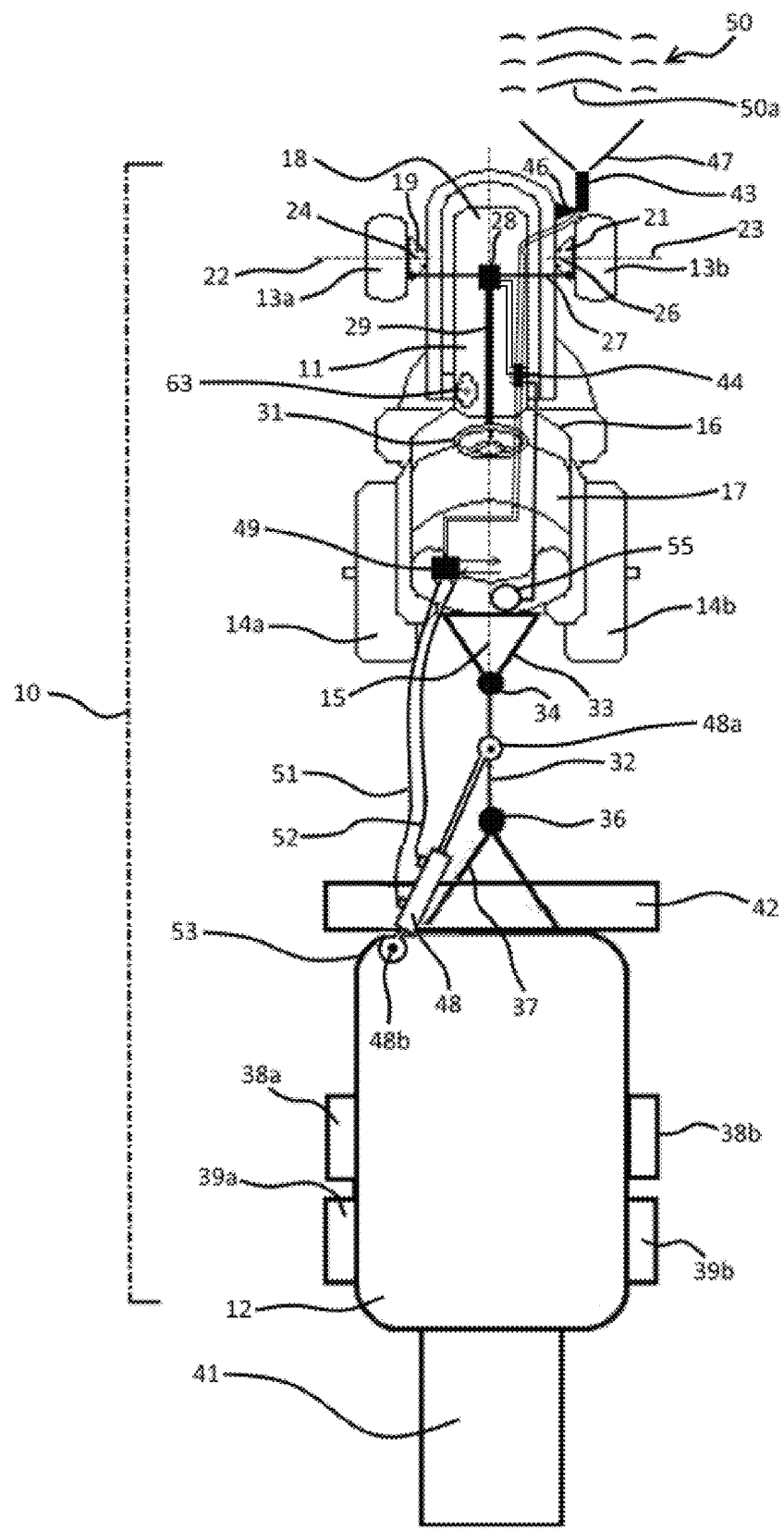
FIG. 1 is a schematic plan view from above of a tractor-baler combination, according to the invention, including a sensor for sensing a line of a swath of crop material, a control apparatus that steers the tractor in dependence on the output of the sensor in a manner avoiding crossing of the swath by the wheels of the tractor; a baler including a pickup, an actuator that is capable of steering the baler relative to the tractor and a control apparatus that causes the line steered by the trailer to optimise the ingestion of crop material via the pickup.

Referring to FIG. 1 there is shown in schematic form a tractor-trailer combination 10 according to the invention.

The tractor-trailer combination 10 includes a tractor 11 that tows a trailer in the form of a baler 12. As noted herein the trailer of the tractor-trailer combination 10 may in other embodiments of the invention take other forms. The following description focuses predominantly on the towing of a baler during baling operations. The person of skill in the art however will readily be able to apply the principles of the invention to situations in which trailers other than balers are towed in fields including swaths, windrows or equivalent features that it is undesirable to run over.

The tractor 11 includes four ground-engaging members in the form of front and rear pairs 13a, 13b, 14a, 14b of tyred wheels of which the rear pair 14a, 14b are of significantly larger diameter than the front pair 13a, 13b, although this need not necessarily be the case in other embodiments of the invention. The tractor 11 also includes a main frame 16 supporting a driver's cab 17 and an engine and drive train that render the tractor 11 self-powered and hence essentially autonomous.

The engine and drive train are not visible in FIG. 1 by reason of being obscured beneath an engine hood 18. Such features of the tractor 11 are of conventional design. Thus a multi-cylinder diesel engine supported in the main frame 16 generates rotary drive that is transferred via one or more clutches, a multi-ratio transmission and a differential axle to cause powered rotation of the rear wheels 14a, 14b under the control of fuelling and speed control components collectively referred to herein as a throttle. The foregoing features of the tractor 11 permit powered forward and, if a reverse transmission ratio is selected using the clutches and transmission, reverse driving of the tractor 11 in ways that are well known.

In some tractors the rotary drive generated by the engine also may be transferred to power the front wheels 13a, 13b. Such tractors are within the scope of the invention.

In yet further designs of tractor, also within the scope of the invention, the ground-engaging members are in the form of articulated, endless tracks or belts instead of wheels. It is also known for e.g. only the rear wheels of the tractor 11 to be replaced by such articulated tracks or belts with the front wheels 14a, 14b retaining the form shown in outline in FIG. 1. All such variants are within the scope of the invention.

The front wheels 13a, 13b are steerable as a result of inclusion of a steering mechanism that is described below.

The steering mechanism includes front wheel axles 19, 21 that permit the front wheels 13a, 13b to rotate about respective horizontal axes 22, 23 defined on either side of the front of the tractor 11.

The front axles 19, 21 additionally are rotatable about respective vertically extending axes 24, 26, by reason of rotatable pin-type connections to the main frame 16 or to components that are fixed relative to the main frame 16.

A steering rod 27 extends between the axles 19, 21 and is pivotably connected at each end to a respective said axle 19, 21 at a respective location that lies rearwardly of the vertically extending pivot axes 24, 26. As a result lateral movement of the steering rod 27 causes the axles 19, 21 to pivot clockwise or anticlockwise about the axes 24, 26, depending on whether the steering rod 27 moves to the left or the right as viewed in FIG. 1.

When as shown in FIG. 1 the front wheels 13a, 13b adopt the steering position corresponding to straight ahead travel of the tractor 11 the axes 22, 23 coincide and are perpendicular to a notional longitudinal axis 15 extending from the front to the rear of the tractor 11. On turning of the axles 19, 21 about the axes 24, 26 the horizontal axes 22, 23 become non-coincident and skewed relative to longitudinal axis 15 as is known in vehicle steering systems.

As is also commonplace in vehicle steering arrangements the components of the steering mechanism in practical embodiments of the invention include design features that take account of the differing arc radii that the wheels 13a, 13b must describe when effecting a turn. Such features are omitted from FIG. 1 for ease of viewing.

Lateral movement of the steering rod 27 results from operation of a steering box 28. This receives as a mechanical input rotation of a steering column 29 extending from the vicinity of the steering mechanism components rearwardly into the cab 17. The steering column 29 is supported for rotation in a per se known manner that it is not necessary to describe herein since such features of vehicle design are well known.

A rotatable steering wheel 31 is supported on the steering column 29 inside the cab 17 and may be rotated manually by the driver of the tractor 11. Such rotation causes rotation of the steering column 29 that is converted to side-to-side movement of the steering rod 27 by the components of the steering box 28. Steering box 28 may be of a per se known design.

The steering box 28 in the embodiment of the invention shown in FIG. 1 also includes or is operatively connected to a steering motor that is omitted from FIG. 1 for clarity. The motor and a control apparatus that is operatively connected to it from time to time during operation of the tractor-trailer combination 10 cause the steering box 28 to effect side-to-side movement of the steering rod 27 based on commands generated by the control apparatus, and without any need for rotation of the steering wheel 31 by the driver. Certain forms of such movement are described herein.

Self-steering agricultural vehicles are known. The steering motor and control apparatus may in essence adopt the forms of such components as are known in the prior art, but the programming of one or more programmable devices forming part of the control apparatus in accordance with the invention is such as to produce novel effects as described herein.

The baler 12 is connected to the tractor 11 by a schematically illustrated drawbar 32 such that the baler 12 is towed behind the tractor 11 when the tractor 11 moves forwardly. Drawbar 32 is pivotably secured at its in-use forward end to a towing hitch 33 by way of a pivot joint 34. Hitch 33 may be e.g. a moveable (e.g. three-point) hitch or a fixed hitch, as would be known to the person of skill in the art.

The drawbar 32 is pivotably connected to an attachment location on the baler 12 at its rear end. In the embodiment illustrated in FIG. 1 the drawbar 32 attaches by way of a further pivot joint 36 to a rigid tongue 37 that is secured to and projects forwardly from the centre of the forwardmost part of the main frame of the baler 12.

The baler 12 in FIG. 1 includes a pair of parallel axles supporting front 38a, 38b and rear 39a, 39b rotatable wheels that support the baler 12 and permit its towed movement. As will be known to the person of skill in the art, other baler axle arrangements are possible. Such variants are within the scope of the invention.

The baler 12 in FIG. 1 is a rectangular baler and is shown ejecting a formed rectangular bale 41 from its rear chute. As noted however the baler may be a round baler. The principles of the invention moreover are applicable to any size of baler.

As is also referred to below the baler 12 includes at its forwardmost end a pick-up 42 for causing harvest products requiring baling to be ingested into the baler 12. The pick-up 42 consists of a rotatable pick-up cylinder that extends from one side of the baler 12 to the other a short distance above the ground over which the baler 12 travels in use.

The pick-up cylinder includes an array of externally projecting tines or fingers that on rotation of the pick-up cylinder lift harvest products defining a swath 50 over which the baler 12 moves and urge them rearwardly to a stuffer mechanism that in a per se known manner carries them inside the baler for baling within one or more internal chambers designed for creating bales.

The baler 12 in FIG. 1 does not have its own source of motive power. Therefore it relies on the transfer of rotary power from the tractor 11 via a power take-off (PTO) shaft that interconnects the tractor 11 and the baler 12. PTO shafts are extremely well known in agricultural vehicle technology and do not require further description herein. FIG. 1 omits the PTO for clarity, but the person of skill in the art would readily be able to embody this feature in a practical version of the invention. The PTO shaft powers the rotation of the pick-up 42 and the motion of the internal components of the baler 12.

The tractor 11 includes a sensor 43 and a controller represented schematically by numeral 44 or another control device forming part of a control apparatus.

Sensor 43 is mounted on the front of the tractor 11 by way of a bracket 46 or similar support structure and faces forwardly. Sensor 43 is of a type that scans the field in front of the tractor 11 and generates signals (especially electrical signals) that are indicative of the features lying in the path of the tractor. Sensor 43 includes a field of view signified schematically by numeral 47 that permits the scanning of a wide area in front of the tractor 11.

Although within the scope of the invention non-optical (e.g. radar and acoustic) sensor types are possible, in practical embodiments of the invention the sensor 43 may be an optical device such as but not limited to a charge-coupled device camera. The output of the sensor is transmitted typically using electrical wires as indicated in FIG. 1 to the controller 44, although other means of signal or data transmission, including wireless types, are possible within the scope of the invention.

Controller 44 is programmable and includes software the purposes of which are (a) to condition the output of the sensor 43 for analysis; and (b) to analyse the data (images) generated by the sensor 43 in a manner that distinguishes between the swath 50 on the one hand and other features in the field on the other.

The controller 44, which as noted forms part of the control apparatus of the tractor-trailer combination 10, produces control signals based on the output of the sensor 43 as described in more detail below.

In accordance with an important aspect of the invention, the controller 44 is operatively connected, by transmission wires as indicated (although as mentioned other methods of signal transmission are possible within the scope of the invention) to the steering motor contained within the steering box 28. The controller 44 thus may control the steering of the tractor 11 in dependence on the output of the sensor 43. As explained further herein, the control exerted by the controller 44 is such as to prevent, or at least minimise the chance of, any ground-engaging member of the tractor 11 running over any part of a swath detected by the sensor 43.

In addition to the foregoing the tractor-baler combination of FIG. 1 includes features that permit the steering of the baler 12 relative to the tractor 11.

These features include an actuator that in the FIG. 1 embodiment is in the form of a double-acting hydraulic cylinder 48. Cylinder 48 is pivotably connected at its in-use forward end 48a to a location on the drawbar 32, and at its rear end 48b to a location on the baler 12 that is fixed relative to the main frame of the baler 12 and offset laterally from the transverse centre of the baler 12.

As is commonplace the tractor 11 and/or the baler 12 includes a hydraulic control circuit including a pump, filter, control valves and various ancillary parts that give rise to a controllable hydraulic supply. In FIG. 1 such parts are schematically illustrated in a truncated form by manifold 49 located on the tractor. The flow of hydraulic oil to and from the manifold 49 is signified schematically by arrows in FIG. 1.

Respective extension and retraction hydraulic supply hoses 51, 52 connect between the manifold 49 and the cylinder 48 for effecting extension and contraction of the cylinder 48 in a per se known manner. Control signals generated in the control apparatus as represented by controller 44 are transmitted to the hydraulic control circuit e.g. in the form of actuator signals for one or more solenoid actuated valves forming part of the hydraulic circuit. Such control signal transmission is represented schematically in FIG. 1 by electrical wires extending from the controller 44 to the manifold 49, but this feature of the invention may be embodied by a range of alternative means. Such means could include wireless communications, although it is more likely that wired transmission protocols would be preferred.

In another possible arrangement within the scope of the invention the baler 12 may include its own hydraulic circuit including a pump, hoses, filters, valves and ancillary components. The pump of such a circuit may be powered from the PTO shaft described above. An advantage of such an arrangement is that it is not necessary to provide the hoses 51, 52 extending between the tractor 11 and the actuator 48, and instead much shorter supply hoses may connect the actuator 48 to the hydraulic circuit of the baler. It would however in such an embodiment remain necessary to transmit control signals from the controller 44 to any electrically operated parts of the baler hydraulic circuit. Such transmission can take place e.g. wirelessly or by way of appropriate signal wires.

It is also possible to employ one or more pneumatic circuits in partial or complete replacement of the described circuits. The person of skill in the art is readily able to embody such variants of the invention.

Figure 2:
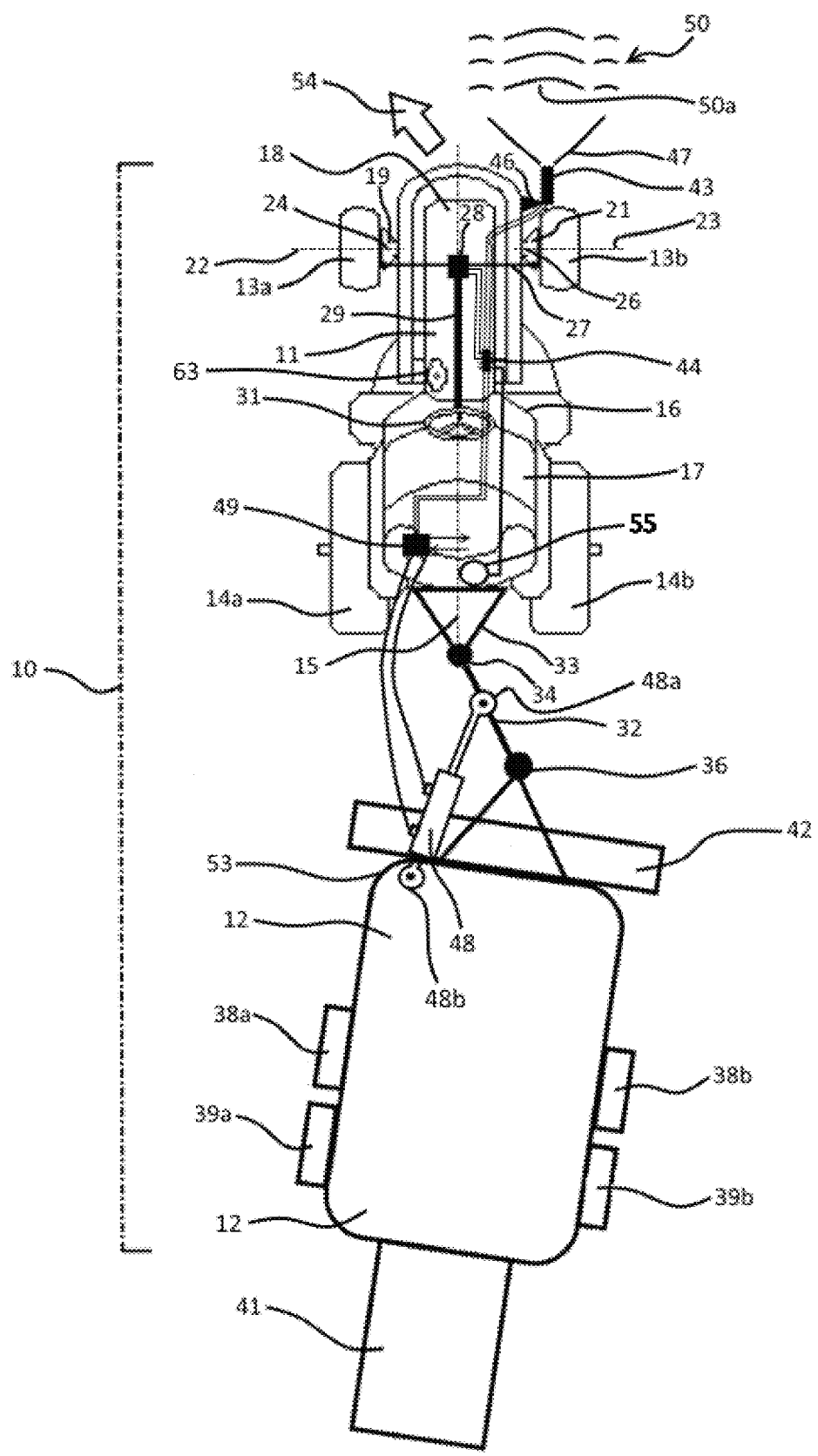
FIG. 2 is a similar view to FIG. 1, showing the baler being towed at an offset to the longitudinal centre line of the tractor.

Regardless of the fluid power arrangement adopted, the control apparatus of the tractor-baler combination generates control signals for the cylinder 48 in dependence on the output of the sensor 43. It will be apparent that extension and retraction of the cylinder 48 cause the baler 12 to steer relative to the line followed by the tractor. This is illustrated in FIG. 2, in which the baler 12 is shown steering to the right as a result of contraction of the cylinder 48 from a neutral position. Extension of the cylinder 48 from the neutral position causes steering of the baler 12 to the left relative to the tractor 11.

The control philosophy determining whether the baler 12 steers relative to the tractor 11 may be determined based on e.g. the design of the baler, the type of crop and so on so as to optimise the ingestion of crop material into the baler.

One control approach may involve seeking to maintain the transverse centre of the baler pickup 42 aligned with the middle 50a of the swath 50 (also referred to herein as the line of the swath 50) unless a sensor in the baler 12 (the output of which sensor being input to the controller 44) indicates uneven filling of a bale-forming chamber inside the baler 12.

Figure 6:
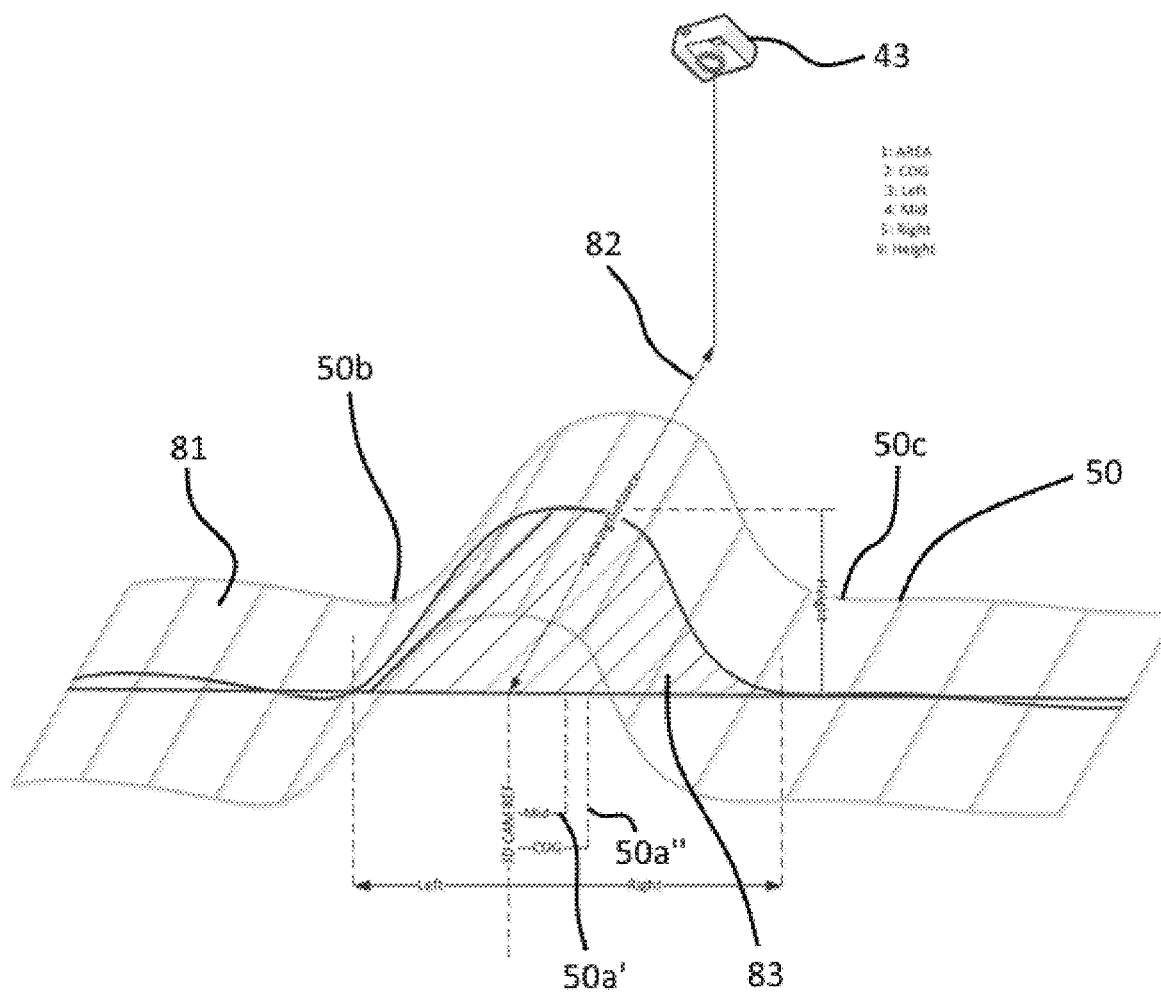
FIG. 6 illustrates how certain characteristics of a swath are detected by the sensor, and how this information is used to determine the middle of the swath.

For the purpose of determining the middle 50a of the swath 50, two strategies are available as illustrated in FIG. 6.

FIG. 6 illustrates by way of the window pane-shaded image 81 the form of a swath 50 over a distance 82 extending forwardly of the sensor 43 that is detectable by the sensor 43. The distance is identified as the parameter "viewing Distance" in FIG. 6 that as desired may be used as an input to the controller 44. Similarly the swath height parameter visible in FIG. 6 may be used as a control or calculation input, especially when adopting the COG calculation method described below.

Also visible in FIG. 6 is a diagonally shaded image 83 representing the output of the sensor 43 at a given instant during its operation. Image 83 is a two-dimensional image that is the instantaneous transverse cross-section of the swath 50 as detected by the sensor 43.

Both the possible strategies rely on detection of the left and right edges 50b, 50c of the swath 50, as detected by the sensor 43. In the first strategy, one form 50a' of the middle 50a of the swath 50 is calculated as the average distance between the left and right edges 50b, 50c. According to the second strategy, which is referred to as the COG ('centre of gravity') approach in FIG. 6, the mid-point 50a" of the swath 50 is taken to be the position at which half the the area formed by the height of the swath 50 and the distance between its left and right edges 50b, 50c is to the left of the middle line 50a", and half this area is to the right of the middle line. The cross-sectional area may be determined in part through knowledge of the height of the swath 50. The sensor 43 may be of a type that can measure the swath height, as indicated schematically in FIG. 6. The latter approach to determining the middle 50a of the swath 50 takes account of the possibility that the cross-section is asymmetric in some way.

Following determination of the middle 50a of the swath 50 the baler 12 may then be steered to the left or the right as exemplified by FIG. 2 such that an offset region of the pickup 42 follows the middle 50a of the swath for a period, until the baler sensor indicates that even chamber filing has been achieved. Once this is the case the offsetting may be adjusted as necessary, e.g. so that the transverse mid-point of the pickup 42 follows the middle 50a of the swath 50.

In FIG. 2 the tractor-baler combination 10 is shown at such a time, part-way through adjusting its trajectory, at a time just before the tractor encounters the end of a swath 50. In FIG. 2 therefore the control action resulting in steering of the baler 12 has been effected so that the middle 50a of the swath aligns with the transverse mid-point of the pickup 42 of the baler 12. As shown in FIG. 2 however the wheels 13a, 13b of the tractor 11 steer as signified by arrow 54 in order to prevent the wheels of the tractor from running over the swath 50. Such steering would be effected through signals generated in the controller 44, based on the output of sensor 43, acting on the steering motor to effect the steering action.

Such steering of the tractor may cause the alignment of the baler 12 relative to the swath 50 to be sub-optimal. The apparatus may therefore effect one or more subsequent trajectory corrections, acting on the tractor 11, the baler 12 or both.

It will be appreciated that the foregoing represents a very simple control approach. More complex control philosophies (that may rely e.g. on moisture, density and other physical measurements of the crop material ingested into the baler 12) may additionally or alternatively be programmed into one or more programmable devices (such as controller 44) forming part of the control apparatus of the tractor-baler combination.

A further optional refinement of the tractor-baler combination is the inclusion of a speed control feature.

It is commonplace to include one or more sensors of forward speed, in a tractor such as tractor 11. Such a sensor may operate on the basis of settings of components of the throttle of the tractor 11 and the transmission ratio selected (all of which aspects in a modern tractor are sensed using appropriate sensors). The forward speed of the tractor 11 may be calculated by e.g. the controller 44 using such inputs.

Alternatively it is known to include a sensor that produces as an output signal an absolute measure of the tractor speed. Such a sensor could be a Doppler sensor that measures progress relative to the surroundings of the tractor, or an optical or inductive device that detects the rotational speed of an element in the drive train of the tractor, such as but not limited to a drive shaft or an axle shaft.

The outputs of such sensors may be input to the controller 44 that may generate control signals adjusting the speed of the tractor 11 in order to ensure that the ground-engaging members do not run over the swath 50.

In this regard it is known that for a given degree of turn of the steerable front wheels 13a, 13b of the tractor 11 it will travel forwardly further per degree of turn described when the tractor is travelling at a relatively high speed than at a relatively low speed.

The tractor 11 therefore also may include a sensor of the steering angle to which the steerable front wheels 13a, 13b are set at any given instant. This also may be used as an input to the controller 44 or another part of a control apparatus in order to assist in determining an optimal speed at which the tractor 11 should effect turns aimed at optimising the ingestion of crop material into the baler 12 while preventing running over of the swath 50.

Sensor inputs of the foregoing kinds are explained further, below, in relation to FIG. 4.

The baler 12 may include one or more steerable axles. In one form of such an arrangement referred to herein as an actively steerable axle, the baler includes a main frame represented schematically by numeral 53 in FIG. 1, at least one steerable axle defining a pivot and at least one steering arm that is connected to the steerable axle, at least one further actuator being pivotably secured at each of two ends to extend between the steering arm and an anchor location that is fixed relative to the main frame (and indeed may be located on the main frame) such that operation of the at least one further actuator causes force to act on the steering arm whereby to cause steering of the steerable axle about the pivot. Such features are omitted from FIG. 1 for ease of illustration, but may readily be embodied by the person of skill in the art.

This form of steerable axle involves control aspects that may be embodied as control signals generated by the processor 44 or another part of the control apparatus. It is in an alternative arrangement within the scope of the invention possible to provide one or more passively steerable axles of the baler 12, that describe steering arcs when the baler 12 is subject to forces (as may be generated by the tractor 11) slewing it to one side or the other. Such passively steerable axles are known in the trailer art and in like manner to the actively steerable axle described above assist the baler to describe tighter turns than would be the case if the angles of the baler axles were fixed.

The hitch 33 mounted on the tractor 11 also may in some embodiments of the invention be arranged to be moveable transversely relative to the tractor 11. To this end the tractor 11 may include a hitch actuator 55 for causing transverse movement of the hitch relative to the remainder of the tractor, the control apparatus being operatively connected to operate the hitch actuator in dependence on the at least one output of the sensor 43 in order to optimise the trajectory of the trailer relative to the transverse extent of the swath. The hitch actuator is shown in FIG. 1 as an electric motor that is drivingly engaged with the hitch 33, the movement of which may be constrained to a side-to-side path. Various other forms of actuator 55 (such as but not limited to electric and hydraulic actuators) are also possible as will occur to the person of skill in the art.

Thus a plurality of means of steering parts of the tractor-baler combination may be provided. Operating in a co-ordinated manner under the influence of the control apparatus, such sub-systems may give rise to rapid steering effects of the tractor 11 and/or the baler 12. In turn this means that the tractor-baler combination may rapidly adjust to optimise the ingestion of crop material into the baler 12 while avoiding the risk of the ground-engaging members of the tractor 11 running over the swath.

FIGS. 3a, 3b and b show a typical sequence of tractor steering adjustments resulting from operation of the apparatus of the invention.

In FIGS. 3a and 3b a tractor-baler combination 10 not according to the invention, by reason of not including a pivotally attached baler, is illustrated turning in a field headland from an initial orientation (FIG. 3a) in which the combination 10 is askew relative to a swath 50 to a baling orientation (FIG. 3b). The primary objective of the manoeuvre is to ensure that the tractor-baler combination is lined up ready to ingest crop material by the time the pickup 42 of the baler 12 encounters the end of the swath 50 of matter lying in the field. It is apparent that in order to achieve this outcome, the tractor 11 may need to adjust its trajectory (under the influence of control signals generated in the controller 44) plural times if crossing of the swath by the front or rear wheels of the tractor 11 is to be avoided. Such trajectory adjustment is schematically signified in FIG. 3b by the trajectory lines 61, 62 that have been traced to illustrate the path taken respectively by the tractor 11 and the baler 12. As is apparent from FIG. 3b the need for repeated correction of the trajectory of the tractor 11 causes the path followed by the tractor 11 (trajectory line 61) and baler 12 (trajectory line 62) to cross the swath 50 several times before the tractor 11 and baler 12 are correctly aligned to follow the swath 50. As explained above crossing of the swath 50 by the wheels of the tractor 11 results in various disadvantages in terms of baling efficiency and reliability.

Figure 4A:
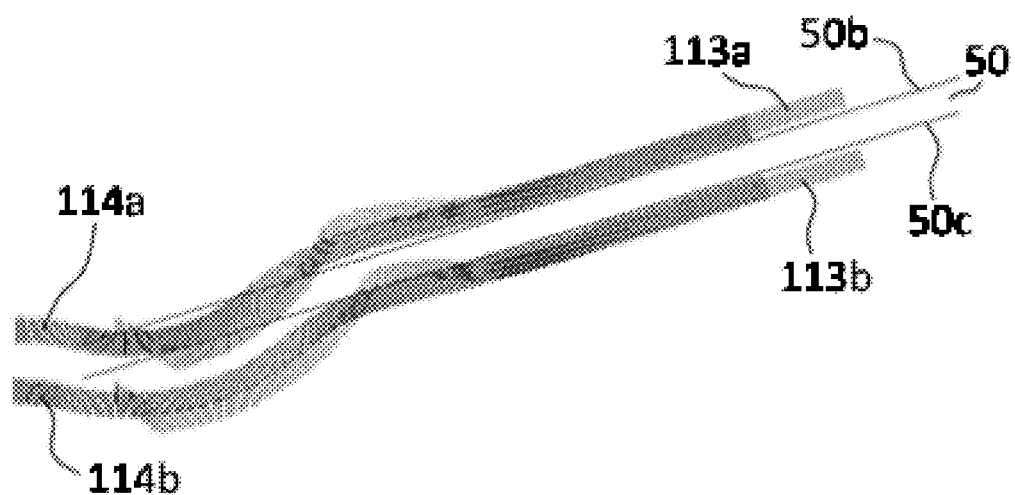
FIG. 4a illustrates the FIG. 3b trajectories in more detail.

FIG. 4a illustrates in more detail the path taken by the wheels of the tractor of a tractor-baler combination in which the baler does not feature a pivotable drawbar. FIG. 4a shows that the front wheel paths 113a, 113b and the rear wheel paths 114a, 114b traced by the tractor wheels may cross the swath 50 multiple times. From FIG. 4a it is evident that in the absence of a pivotable drawbar, alignment of the baler for optimal pickup and minimized crushing of crop material is still possible, although superior results are achieved when a tractor-trailer combination according to the invention is equipped with a baler featuring a pivotable drawbar.

Once the tractor 11 and baler 12 are aligned to follow the line of the swath however the tractor in many instances may follow a trajectory determined only by a need to minimise the error between an actual and a desired trajectory based on e.g. the middle or the detectable lateral boundaries of the swath 50, where the middle 50a is determined as described in relation to FIG. 6.

Such an error signal can be generated by the controller 44 as described below. Assuming careful selection of e.g. the gain terms and or the "order" of any control law expression used in programming the controller 44 the travel of the tractor 11 may be smooth and free of sudden changes of direction once the tractor-baler combination is aligned with the swath. Should any adjustments of the trajectory of the baler then be needed in order to optimise the ingestion of crop material these can be effected e.g. by operating the actuator 48 or a steerable axle as described above, without having to perturb the trajectory of the tractor 11. This ensures smooth progress of the tractor, with various attendant benefits in terms of safety and driver comfort.

Figure 4B:
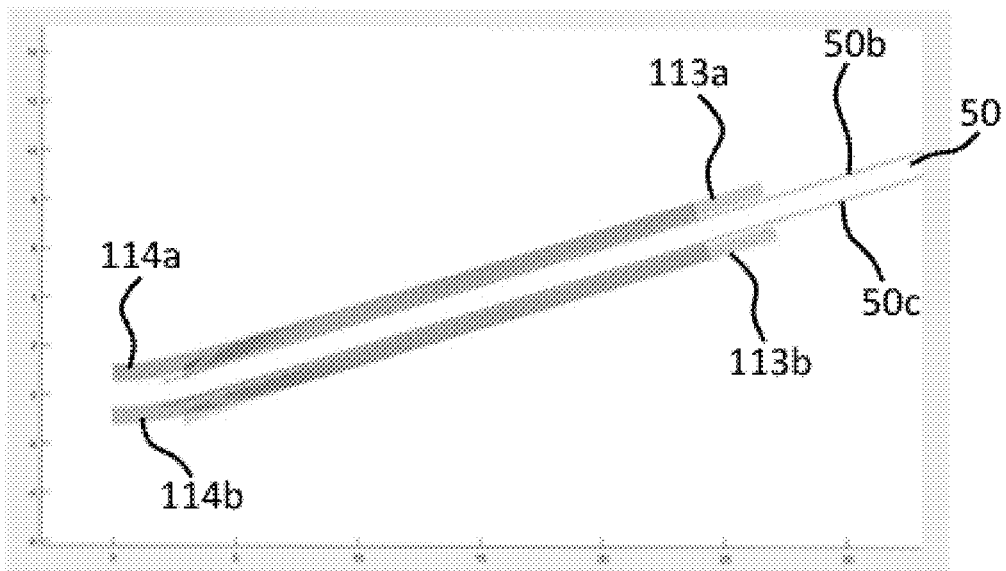
FIG. 4b is a view similar to FIG. 4a in which the tractor-trailer combination is in accordance with the invention, and in which the trajectory of the tractor is optimised in accordance with the principles of the invention as defined herein.

The trajectory of the tractor 11 is illustrated in further detail in FIG. 4b, which is a schematic plan view of a section of field over which a tractor-trailer combination 10 according to the invention has travelled in a manner minimising crushing of the crop material by the tractor wheels. In FIG. 4b the lines 50b, 50c represent the lateral boundaries of the swath 50; lines 113a and 113b respectively represent typical paths traced by the front wheels 13a, 13b of the tractor 11 during manoeuvring as summarised in FIGS. 3a and 3b; and lines 114a, 114b respectively represent typical paths traced by the rear wheels 14a, 14b of the tractor 11 during such manoeuvring.

It is apparent from FIG. 4b that the extent to which the wheels 13, 14 run over the swath 50 is negligible or minimal, thereby giving rise to the advantages of the invention as discussed herein.

Figure 5:
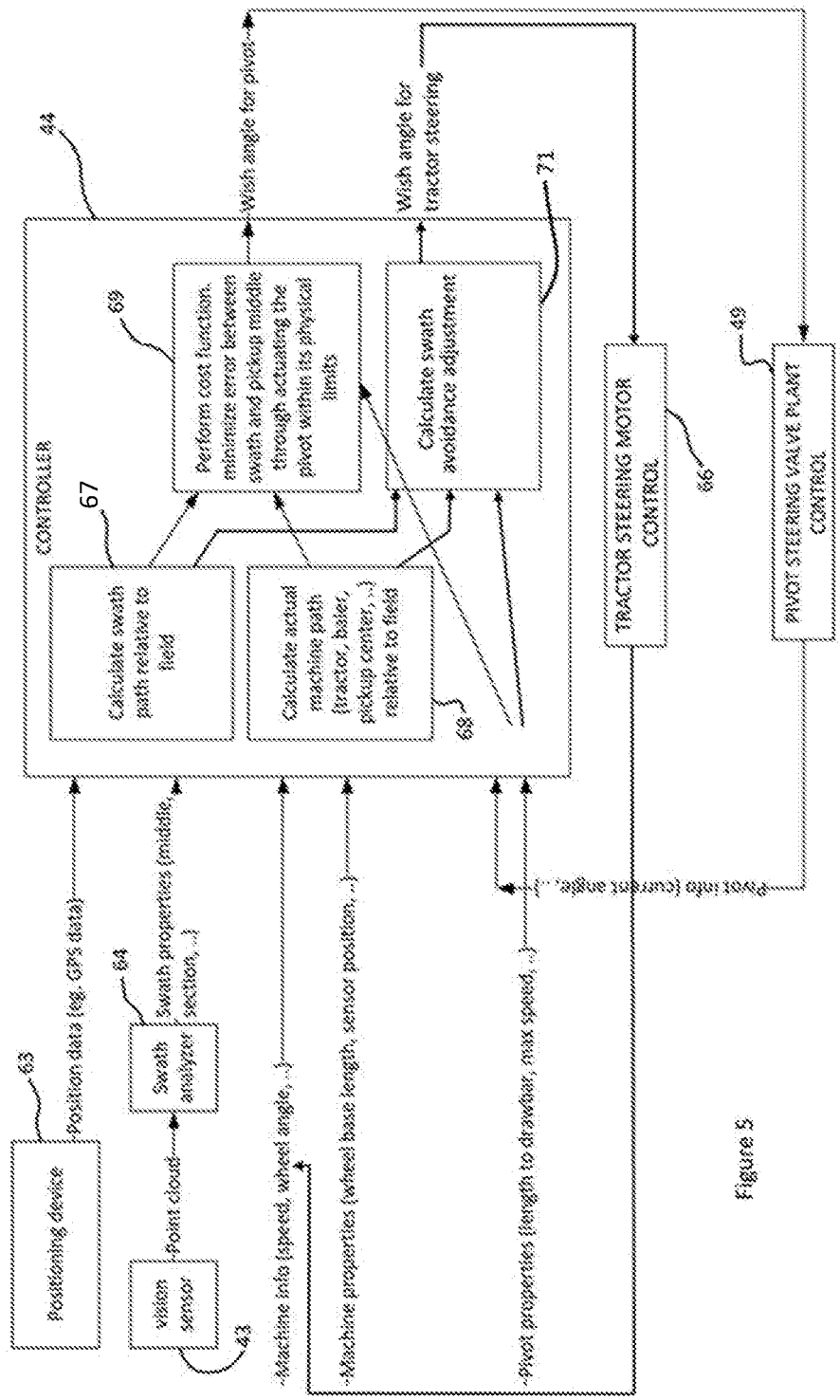
FIG. 5 is a schematic illustration of how the output of the sensor is used to control the steering of the tractor and the trailer.

FIG. 5 illustrates in a flowchart how the controller 44 generates an error signal based on the output of the sensor 43.

FIG. 5 illustrates the parts of the tractor 11 that are responsible for accurately determining the desired path of the tractor-trailer combination 10 together with the manifold 49 or equivalent component that controls the lateral position of the baler 12 relative to the tractor 11.

In FIG. 5 the primary control component is the controller 44 referred to above. As noted this may be a discrete device mounted e.g. under the tractor engine hood 18; or it may be constituted by more than one component. Alternatively, the controller 44 may be comprised inside the baler controller, and may therefore be mounted under the baler hood. However, it is desirable but not essential that part or all of the controller 44 is secured to the tractor 11.

The tractor 11 preferably includes a GPS or other position-determining module 63 that is also shown schematically in FIGS. 1 and 2. The position-determining module 63 generates as an output one or more position signals. These typically but not necessarily are electrical signals transmitted using wires inside the tractor or wirelessly and are indicative of the position (e.g. as signified by map co-ordinates) of the tractor 10. The position signals are input to the controller 44 as illustrated.

The sensor 43 generates a signal output that again typically but not necessarily is constituted by one or more electrical signals.

As signified by the text in FIG. 5 some forms of vision sensor that are suitable for use in the invention may generate a so-called "point cloud", i.e. an array of data points that are mapped in a co-ordinate system such that features and artefacts sensed by the sensor may be position-tagged such that the field of view of the sensor 43 at any given moment may be analysed, displayed or transmitted.

The data represented by the point cloud are analysed in a module 64 referred to as a swath analyser that extracts from the point cloud the key characteristics needed to steer the tractor in a manner avoiding running over of the swath 50 in front of the tractor. Such data may include e.g. the width of the swath 50 as sensed by the sensor 43, the height of the swath 50 and the middle 50a of the swath 50 as represented by the mid-way point between the lateral boundaries. Other features of the swath may be derived from the point cloud data.

The controller 44 calculates the path traced by the swath 50 relative to the field under consideration, as signified at Step 67 in FIG. 5. Controller 44 at Step 68 also determines (e.g. from the GPS data, and vehicle settings such as the sensed steering angle, the vehicle forward speed and so on) the position of part of the tractor-trailer combination 10 relative to the field. The part of the combination 10 may be e.g. the location of the sensor 43, the location of the mid-point of the baler pickup 42, or any of a range of other locations determined to be of assistance in operation of the invention.

The swath path and the tractor position are then compared as signified at Step 69 and an error signal generated. The error signal, that typically is an electrical signal, is proportional to the difference between the position of the chosen part of the tractor-trailer combination mentioned above and the path of the swath. The error signal is then used as an input, as signified in FIG. 5, to the manifold 49 or if preferred another control element that determines the lateral position of the baler 12 relative to the tractor 11. This arrangement causes actuation of an element such as the hydraulic cylinder 48 (or an alternative actuator if such is present) to effect lateral movement of the baler in a manner optimising the ingestion of crop material into the baler 12.

As signified in FIG. 5 the setting of the cylinder 49 or other actuator is fed back to the Controller 44 and used in a routine, the aim of which is to minimise the error signal generated at Step 69.

In addition to the foregoing the swath path calculation and the tractor path calculation are used in a further Step 71 that produces a swath run-over minimisation signal. This is input to the motor or other control element controlling the steering of the tractor, as indicated at Step 66. The result of this control action is to steer the tractor 11 in a manner avoiding the crushing of the swath 50, as explained herein.

The tractor steering angle may be sensed e.g. by sensing the position of the steering motor away from a position corresponding to straight-ahead travel. A signal such as an electrical signal may be generated that indicates the steering angle of the tractor. This can be fed back to the controller 44 as indicated in FIG. 5.

In addition to the foregoing the controller may receive as inputs a number of parameters of the tractor-trailer combination and/or its operation. Some non-limiting examples are presented in FIG. 5 and include the output of the speed sensor referred to above, various dimensional parameters such as the vehicle size (and especially its wheelbase), the location of the sensor 43 relative to the remainder of the vehicle; and properties of the arrangement for causing lateral offsetting of the baler 12. The last-mentioned properties can include e.g. the length of the drawbar 32; and information on the speed at which the cylinder 48 may effect steering of the baler 12.

Such parameters may be sensed in real-time, although they may more efficiently be firmware properties that the controller 44 may receive in a data transmission on initial hitching of a baler or other trailer to the tractor with which the controller 44 is associated.

More generally, the optimal algorithm will prioritize avoiding crushing the swath 50, whenever this is possible within the physical limits of the pivotable drawbar. Should the algorithm detect that no non-crushing solution exists within such limits, it will attempt to achieve an optimal trade-off between crushing of the swath 50 and non-centred pickup. Alternatively, the operator can override this and choose an optimal pickup position, which would sacrifice performance in terms of crushing the swath 50, or a non-optimal pickup position, which would prioritize not crushing the swath 50, but would sacrifice performance in terms of pickup position. Appropriate control elements in the form of e.g. pushbuttons, levers or touchscreen icons may be provided in the operator's cab 17 for the purpose of selecting the desired control approach.

For the avoidance of doubt, the invention is considered to reside in a programmable device as described herein; a computer-readable medium containing instructions for the operation of such a programmable device; and a trailer such as a baler as defined herein, when considered independently of any towing tractor.

The listing or discussion of an apparently prior-published document in this specification should not necessarily be taken as an acknowledgement that the document is part of the state of the art or is common general knowledge.

Preferences and options for a given aspect, feature or parameter of the invention should, unless the context indicates otherwise, be regarded as having been disclosed in combination with any and all preferences and options for all other aspects, features and parameters of the invention.

What is claimed is:

1. A movable tractor-trailer combination comprising:
   a self-powered tractor comprising a plurality of ground-engaging members and a steering mechanism for steering at least one of the plurality of ground-engaging members so as to cause changes in a direction of movement of the tractor;
   a trailer that is towed behind the tractor as the tractor moves forwardly;
   a drawbar that is pivotably connected at a tractor connection to the tractor and at a location spaced along the drawbar to an attachment location on the trailer;
   at least one actuator comprising a first end connected to the drawbar and a second end connected to the trailer, for steering the trailer relative to the tractor;
   at least one sensor for sensing a line of a swath of crop material corresponding to a maximal quantity of crop material per unit length of the swath; and
   a control apparatus configured for controlling:
      the at least one actuator in dependence on at least one output of the at least one sensor in order to optimize a trajectory of the trailer relative to a transverse extent of the swath, and
      the steering mechanism of the tractor in dependence on the at least one output such that the tractor moves along the swath without any of the ground-engaging members running over the swath.

2. The tractor-trailer combination according to claim 1, wherein the trailer is a baler that comprises:
   a pickup extending transversely relative to the baler for causing ingestion of crop material lying on the ground into the baler for baling; and
   at least one chamber for receiving crop material ingested by the pickup and forming the crop material into bales,
   wherein the control apparatus is further configured for controlling the at least one actuator to steer the baler relative to the tractor in order to further optimize the ingestion of crop material via the pickup.

3. The tractor-trailer combination according to claim 2, wherein the at least one actuator extends between a forward location on the drawbar and a location on the baler disposed rearwardly of and offset transversely from the forward location such that operation of the at least one actuator causes steering of the baler relative to the tractor about the attachment location.

4. The tractor-trailer combination according to claim 1, wherein the tractor further comprises a speed control mechanism for controlling a speed of forward movement of the tractor-trailer combination; and wherein the control apparatus additionally is operatively connected to the speed control mechanism and is further configured for controlling the forward speed of the tractor-trailer combination in dependence on the at least one output.

5. The tractor-trailer combination according to claim 1, wherein the trailer comprises:
   a main frame;
   at least one steerable axle defining a pivot and at least one steering arm that is connected to the steerable axle; and
   at least one further actuator being pivotably secured at each of two ends to extend between the steering arm and an anchor location that is fixed relative to the main frame such that operation of the at least one further actuator causes force to act on the steering arm to cause steering of the steerable axle about the pivot.

6. The tractor-trailer combination according to claim 1, wherein the tractor further comprises:
   a hitch defining a pivotable connection of the drawbar to the tractor, the hitch being moveable transversely relative to a remainder of the tractor; and
   a hitch actuator for causing transverse movement of the hitch relative to the remainder of the tractor,
   wherein the control apparatus is further configured for controlling the hitch actuator in dependence on the at least one output in order to further optimize the trajectory of the trailer relative to a transverse extent of the swath.

7. The tractor-trailer combination according to claim 1, wherein the at least one sensor is supported by or forms part of the tractor.

8. The tractor-trailer combination according to claim 1, wherein the at least one sensor is an optical device that generates an output derived from a two-dimensional image of a cross-section of the swath captured by the at least one optical device.

9. The tractor-trailer combination according to claim 8, wherein the at least one optical device is operatively coupled to the control apparatus, wherein the control apparatus is further configured for generating a predicted line of the swath derived from a plurality of two-dimensional images of the cross-section or from a silhouette or outline of the swath captured sequentially by the at least one optical device as the tractor moves forwardly.

10. The tractor-trailer combination according to claim 9, wherein the control apparatus is further configured for determining a deviation of a predetermined part of the trailer from the predicted line of the swath, generating an error signal proportional to the deviation, and transmitting the error signal to the at least one actuator such that the at least one actuator causes steering of the trailer relative to the tractor in a manner that minimizes the error signal.

11. The tractor-trailer combination according to claim 1, wherein the control apparatus is further configured for controlling the steering mechanism of the tractor so as to maintain a predetermined minimum offset of a chosen location on the tractor from the line of the swath, the minimum offset corresponding to an integer or non-integer multiple of a widest transverse width of the tractor between ground-engaging members.

12. The tractor-trailer combination according to claim 1, wherein the control apparatus includes a programmable device that is programmed and operatively coupled to effect steering of the tractor-trailer combination in dependence on the at least one output of the at least one sensor by causing the at least one actuator to steer the trailer relative to the tractor in order to optimize a trajectory of the trailer relative to a transverse extent of the swath, and to operate the steering mechanism of the tractor in dependence on the at least one output such that the tractor moves along the swath without any of the ground-engaging members running over the swath.

13. The tractor-trailer combination according to claim 1, further comprising a computer-readable medium containing instructions for operation of a programmable device to cause the at least one actuator to steer the trailer relative to the tractor in dependence on the at least one output of the at least one sensor in order to optimize ingestion of crop material via the pickup, and to operate the steering mechanism of the tractor in dependence on the at least one output such that the tractor moves along the swath without any of the ground-engaging members running over the swath.

14. A baler towable behind a tractor along a swath of crop material, the baler comprising:
    a pickup extending transversely for causing ingestion of crop material lying on the ground for baling;
    at least one chamber for receiving crop material ingested by the pickup and for forming the crop material into bales;
    at least one actuator comprising a first end connectable to a drawbar and a second end connected to a stationary part of the baler, the at least one actuator operable to steer the baler relative to a tractor;
    an attachment location that is pivotably connectable to one end of the drawbar; and
    a control apparatus configured for controlling:
        the at least one actuator in dependence on at least one output of at least one sensor to steer the baler relative to the tractor in order to optimize the ingestion of crop material via the pickup, and
        a steering mechanism of the tractor in dependence on the at least one output to cause the tractor to move along the swath without any ground-engaging members of the tractor running over the swath.

15. A computer-readable medium containing instructions for the operation of a programmable device of a tractor-trailer combination according to claim 1 to cause the at least one actuator to steer the trailer relative to the tractor in dependence on the at least one output of the at least one sensor in order to optimize ingestion of crop material via the pickup, and to operate the steering mechanism of the tractor in dependence on the at least one output such that the tractor moves along the swath without any of the ground-engaging members running over the swath.

* * * * *